(12) United States Patent
Patil

(10) Patent No.: US 11,926,755 B2
(45) Date of Patent: Mar. 12, 2024

(54) UNIVERSAL PRINTABLE TOPCOAT FOR GRAPHICS

(71) Applicant: Avery Dennison Corporation, Glendale, CA (US)

(72) Inventor: Dhananjay Patil, Thane West (IN)

(73) Assignee: Avery Dennison Corporation, Glendale, CA (US)

( * ) Notice: Subject to any disclaimer, the term of this patent is extended or adjusted under 35 U.S.C. 154(b) by 516 days.

(21) Appl. No.: 17/275,434

(22) PCT Filed: Sep. 13, 2019

(86) PCT No.: PCT/US2019/050979
§ 371 (c)(1),
(2) Date: Mar. 11, 2021

(87) PCT Pub. No.: WO2020/056235
PCT Pub. Date: Mar. 19, 2020

(65) Prior Publication Data
US 2022/0073780 A1  Mar. 10, 2022

(30) Foreign Application Priority Data

Sep. 13, 2018 (IN) .............................. 201811034610

(51) Int. Cl.
| C09D 139/06 | (2006.01) |
| B41M 5/50 | (2006.01) |
| B41M 5/52 | (2006.01) |
| C08K 3/013 | (2018.01) |
| C08K 3/22 | (2006.01) |
| C08K 3/36 | (2006.01) |
| C08K 5/00 | (2006.01) |
| C08K 5/15 | (2006.01) |
| C08K 5/1515 | (2006.01) |
| C09D 131/04 | (2006.01) |
| C09D 133/08 | (2006.01) |

(52) U.S. Cl.
CPC ........... *C09D 139/06* (2013.01); *B41M 5/506* (2013.01); *B41M 5/5254* (2013.01); *C08K 3/013* (2018.01); *C08K 3/22* (2013.01); *C08K 3/36* (2013.01); *C08K 5/0025* (2013.01); *C08K 5/1515* (2013.01); *C09D 131/04* (2013.01); *C09D 133/08* (2013.01); *B41M 2205/12* (2013.01); *C08K 2003/2227* (2013.01)

(58) Field of Classification Search
CPC .. C09D 139/06; C09D 131/04; C09D 133/08; C08K 3/013; C08K 3/22; C08K 3/36; C08K 5/0025; C08K 5/1515; C08K 2003/2227; B41M 5/506; B41M 5/5254; B41M 2205/12

USPC ........................................................ 524/516
See application file for complete search history.

(56) References Cited

U.S. PATENT DOCUMENTS

| 5,972,457 | A | 10/1999 | Matsuishi et al. |
| 6,089,704 | A | 7/2000 | Burns et al. |
| 6,214,458 | B1 | 4/2001 | Kobayashi et al. |
| 6,341,560 | B1 | 1/2002 | Shah et al. |
| 6,458,888 | B1 | 10/2002 | Hood et al. |
| 6,497,941 | B1 | 12/2002 | Landry-Coltrain et al. |
| 6,541,565 | B2 | 4/2003 | Hood et al. |
| 6,548,597 | B2 | 4/2003 | Hood et al. |
| 6,620,521 | B1 | 9/2003 | Kwak et al. |
| 6,635,319 | B1 * | 10/2003 | Sunderrajan ............. B41M 5/52 |
| | | | 428/32.37 |
| 6,713,538 | B2 | 3/2004 | Hood et al. |
| 6,793,333 | B2 | 9/2004 | Brignone et al. |
| 6,806,310 | B2 | 10/2004 | Kopolow et al. |
| 6,854,391 | B2 | 2/2005 | Latunski et al. |
| 6,869,647 | B2 | 3/2005 | Page et al. |
| 6,872,787 | B2 | 3/2005 | Hood et al. |
| 6,939,934 | B2 | 9/2005 | Kopolow et al. |
| 6,984,423 | B2 | 1/2006 | Iida et al. |
| 7,008,979 | B2 | 3/2006 | Schottman et al. |
| 7,041,338 | B2 | 5/2006 | Nigam |
| 7,402,641 | B2 | 7/2008 | Kopolow et al. |
| 7,651,748 | B2 * | 1/2010 | Hood ....................... B41M 5/52 |
| | | | 428/32.29 |
| 7,829,161 | B2 | 11/2010 | Wexler et al. |
| 8,043,787 | B2 | 10/2011 | Hauck et al. |
| 8,808,815 | B2 | 8/2014 | Hood et al. |
| 9,063,423 | B2 | 6/2015 | Igarashi et al. |

(Continued)

FOREIGN PATENT DOCUMENTS

| CN | 103502354 | 1/2014 |
| CN | 108136807 | 6/2018 |

(Continued)

OTHER PUBLICATIONS

"Guide for Application of Non-metal Mineral Products," China Architecture & Building Press, p. 381, Dec. 1986.

(Continued)

*Primary Examiner* — Ling Siu Cho
*Assistant Examiner* — Ronald Grinsted

(57) ABSTRACT

Coated substrates comprising a topcoat are disclosed. The coated substrate may be substantially free of PVC while having performance comparable to a coated substrate comprising PVC. The topcoat may comprise a base polymer comprising a polyvinylpyrrolidone copolymer, such as polyvinylpyrrolidone/vinyl acetate. The base polymer may also comprise a cationic acrylic resin. The topcoat may also comprise a pigment system and optionally, a crosslinking system.

20 Claims, No Drawings

(56) References Cited

U.S. PATENT DOCUMENTS

| | | |
|---|---|---|
| 9,598,601 B2 | 3/2017 | Makotky et al. |
| 9,962,984 B2 * | 5/2018 | Niu .................. B41M 5/5245 |
| 10,875,345 B2 | 12/2020 | Zhou et al. |
| 11,046,862 B2 | 6/2021 | Patil et al. |
| 2003/0072935 A1 | 4/2003 | Iwasa et al. |
| 2004/0091645 A1 | 5/2004 | Heederik et al. |
| 2004/0197572 A1 | 10/2004 | Bell |
| 2005/0271864 A1 | 12/2005 | van Driesten et al. |
| 2006/0263550 A1 | 11/2006 | Nichols et al. |
| 2007/0092668 A1 | 4/2007 | Hood |
| 2016/0046824 A1 | 2/2016 | Hood et al. |
| 2016/0046825 A1 | 2/2016 | Hood et al. |
| 2016/0053131 A1 | 2/2016 | Hood et al. |
| 2016/0059607 A1 | 3/2016 | Hood et al. |
| 2016/0282737 A1 | 9/2016 | Hood et al. |

FOREIGN PATENT DOCUMENTS

| | | | |
|---|---|---|---|
| EP | 0672537 | 9/1995 | |
| EP | 0896883 | 2/1999 | |
| EP | 896883 A1 * | 2/1999 | .......... B41M 5/5245 |
| TW | 2018-42095 | 12/2018 | |
| WO | 2012/078950 | 6/2012 | |
| WO | 2017/216767 | 12/2017 | |
| WO | 2018/160804 | 9/2018 | |
| WO | WO-2018160804 A1 * | 9/2018 | ......... C09D 133/066 |

OTHER PUBLICATIONS

"China Powder Industry Reference Book," China Building Materials Press, p. 163, Sep. 2008.

International Preliminary Report on Patentability dated Mar. 9, 2021 issued in corresponding IA No. PCT/US2019/050979 filed Sep. 13, 2019.

International Search Report and Written Opinion dated Nov. 22, 2019 issued in corresponding IA No. PCT/US2019/050979 filed Sep. 13, 2019.

* cited by examiner

UNIVERSAL PRINTABLE TOPCOAT FOR GRAPHICS

CROSS-REFERENCE TO RELATED APPLICATION

The present application is a 371 of International Patent Application No. PCT/US2019/050979, which was published in English on Mar. 19, 2021, and claims priority to Indian Patent Application No. 201811034610 filed Sep. 13, 2018, both of which are incorporated by herein by reference in their entireties.

FIELD OF THE INVENTION

The present disclosure relates generally to universal printable topcoat formulations for graphics, and in particular to topcoat formulations comprising a base polymer, a pigment system, and a crosslinking system. The present disclosure also relates to substrates coated with the topcoat formulation.

BACKGROUND OF THE INVENTION

Polyvinyl chloride (PVC) films have been used widely in a number of promotional and advertising campaigns, such as outdoor graphics applications in the past. Such applications include signs, banners, fleet marketing graphics, architectural and wall covering, consumer product labeling and other pressure sensitive products. In recent years, however, awareness of the environmental and health impacts and effects of using PVC based products has increased significantly. Currently, there is a movement to reduce or even eliminate PVC-based products from the consumer marketing, promotional and advertising product streams.

Traditionally, wide formatting printing, including eco solvent and solvent-based ink printing relied on PVC-based layers due to their pigment fixation, a result of the plasticity of PVC. PVC-based layers also have good anchorage to underlying layers, such as polypropylene, polyethylene, and other non-PVC media. Efforts have been made to replace PVC-based layers by using different topcoat or primer layers.

U.S. Pat. No. 6,872,787 discloses inkjet printing on textile materials, specifically a composition for coating a single, inkjet-receptive layer onto unsubbed textiles such as canvas, polyester, linen and blends thereof, which accepts inkjet printing with dye and pigment inks and which gives strong colors which are water-resistant.

U.S. Pat. No. 6,458,888 discloses a rheology modifier for use in aqueous or alcoholic compositions. The rheology modifier includes an aqueous two-phase polymeric composition of by weight, 5-75% of (a) a water-soluble polymer having (b) in situ-formed, substantially water-insoluble resinous particles of said polymer substantially uniformly dispersed therein, and (c) 25-95% of water. U.S. Pat. No. 6,548,597 also discloses an aqueous polymeric composition which forms a clear to translucent film upon application to a substrate which includes, by weight, 5-75% of (a) a water-soluble polymer having (b) in situ-formed, substantially water-insoluble resinous particles of said polymer substantially uniformly dispersed therein, and (c) 25-95% of water.

US Publication No. 2016/0059607 discloses a coating composition for forming a toner receptive coating on a substrate containing a polymer comprising: (a) a N-vinyl amide monomer, (b) a vinyl acetate monomer, (c) a substituted or unsubstituted monomer comprising a cyclic ether, and (d) a solvent. The coating compositions may further comprise a (e) non-reactive hydrophobic monomer. The disclosure also provides substrates coated with the toner receptive coatings.

U.S. Pat. No. 8,808,815 discloses an inkjet-receptive article comprising a substrate having a coating thereon comprising a vinyl lactam polymer or copolymer and a polymer resin diluent coated from a solvent. A preferred vinyl lactam copolymer is polyvinylcaprolactam (PVCap)—vinyl acetate (VA). Also disclosed are solvent-based compositions for forming an inkjet-receptive coating on a substrate comprising: (i) a vinyl lactam polymer or copolymer; (ii) a solvent; (iii) optionally, a pigment; and (iv) polymer resin diluent.

The need still exists for a substrate that does not include PVC but which attains acceptable pigment fixation, indoor and outdoor performance, and anchorage to underlying layers or films. The present disclosure includes improved topcoat formulations for printing that include a base polymer, a pigment system and a crosslinking system, which is anchored to underlying non-PVC layers or films.

BRIEF SUMMARY OF THE INVENTION

In an embodiment, the present disclosure is directed to a coated substrate comprising a substrate having a topcoat on at least one surface of the substrate, wherein the topcoat comprises a base polymer comprising a polyvinylpyrrolidone copolymer and a cationic acrylic resin, a pigment system, and optionally a crosslinking system. The topcoat and substrate may be substantially free of polyvinyl chloride. The topcoat may comprise printed or image indicia. The topcoat may comprise from 25 to 80 wt. % base polymer, based on the total weight of the topcoat. The topcoat may comprise from 1 to 20 wt. % polyvinylpyrrolidone copolymer, based on the total weight of the topcoat. The polyvinylpyrrolidone copolymer may comprise polyvinylpyrrolidone and vinyl acetate. The base polymer may comprise from 20 to 60 wt. % cationic acrylic resin, based on the total weight of the topcoat. The cationic acrylic resin may be a high molecular weight cationic stabilized polymer with hydroxyl functionality. The pigment system may comprise a pigment, a filler, and a binding agent. The filler may be a silica. The binding agent may be a metal oxide. The pigment system may comprise from 0.01 to 30 wt. % pigment, based on the total weight of the pigment system. The pigment system may comprise from 0.01 to 30 wt. % filler, based on the total weight of the pigment system. The pigment system may comprise from 0.01 to 30 wt. % metal oxide, based on the total weight of the pigment system. The formulation may comprise from 0.01 to 30 wt. % pigment system. The crosslinking system may comprise an epoxy crosslinker.

In another embodiment, the present disclosure is directed to a method of forming a coated substrate, the method comprising: providing a substrate; providing a topcoat formulation comprising a base polymer comprising a polyvinylpyrrolidone copolymer and a cationic resin, a pigment system, optionally a crosslinking system, and water; applying the topcoat formulation onto at least one surface of the substrate; and drying the topcoat formulation on the substrate to form a coated substrate; wherein the topcoat formulation is coated onto the substrate from 1 to 20 gsm. The topcoat formulation may be gravure coated, knife coated, or mayer bar coated onto the substrate. The topcoat formulation may be corona treated prior to applying the topcoat formulation to the substrate. The topcoat and substrate are substantially free of polyvinyl chloride. The method may further comprise printing text or an image on the topcoat. The formulation may comprise from 25 to 80 wt. % base polymer, based on the total weight of the topcoat formulation, excluding water. The formulation may comprise from 1 to 20 wt. % polyvinylpyrrolidone copolymer, based on the total weight of the topcoat formulation, excluding water. The polyvinylpyrrolidone copolymer may comprise polyvinylpyrrolidone and vinyl acetate. The base polymer may comprise from 20 to 60 wt. % cationic acrylic resin, based on the total weight of the topcoat formulation, excluding water. The cationic acrylic resin may be a high molecular weight cationic stabilized polymer with hydroxyl functionality. The pigment system may comprise a pigment, a filler, and a binding agent. The filler may be a silica. The binding agent may be a metal oxide. The pigment system may comprise from 0.01 to 30 wt. % pigment, based on the total weight of the pigment system. The pigment system may comprise from 0.01 to 30 wt. % filler, based on the total weight of the pigment system. The pigment system may comprise from 0.01 to 30 wt. % metal oxide, based on the total weight of the pigment system. The formulation may comprise from 0.01 to 30 wt. % pigment system, based on the total weight of the topcoat formulation, excluding water. The crosslinking system may comprise an epoxy crosslinker.

DETAILED DESCRIPTION OF THE INVENTION

The present disclosure now will be described more fully. This disclosure can be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

In some embodiments, the present disclosure includes a coated substrate. The substrate may be substantially free of polyvinyl chloride (PVC) but that exhibits desirable pigment fixation, indoor and outdoor performance, and anchorage of the topcoat to the underlying non-PVC substrate. The coated substrate is coated with a topcoat on at least one surface of the substrate. The topcoat is also substantially free of PVC according to certain embodiments of the present disclosure. The topcoat comprises a base polymer, a pigment system, and a crosslinking system. The base polymer comprises a polyvinylpyrrolidone copolymer, such as a polyvinylpyrrolidone/vinyl acetate (PVP/VA) copolymer. The base polymer may also comprise a cationic acrylic resin, e.g., a high molecular weight cationic acrylic resin. Topcoats according to the present disclosure allow for the use of non-PVC substrates because the topcoats have good anchorage to non-PVC substrates while also attaining good pigment fixation. The present disclosure, therefore, also for topcoat formulations that may be coated onto a substrate, e.g., a non-PVC substrate.

Topcoat Formulation

As explained herein, the present disclosure is directed to a coated substrate, wherein the substrate is coated with a topcoat. The topcoat formulation used to form the topcoat comprises a base polymer, a pigment system, and a crosslinking system. The topcoat formulation is aqueous, though the weight percentages herein refer the total amount of components excluding water. Water is added to the other components to allow for dispersion of the other components in water, and to allow for even application of the topcoat formulation to the substrate. As described further herein, the topcoat formulation is then dried, removing substantially all water, e.g., less than 0.001 wt. % water remains in the dried topcoat. When preparing the topcoat formulation, water may present from 10 to 90 wt. %, based on the total weight of the topcoat formulation. The amount of water added depends on the desired solids percentage, the desired viscosity, the coating method, the desired coat weight, and the drying capabilities of the coated topcoat. For example, if the coating method is roller coating, a greater solids percentage is desired as compared to rod coating.

The present disclosure beneficially uses a base polymer comprising a polyvinylpyrrolidone copolymer and a cationic acrylic resin. In terms of lower limits, the topcoat formulation may comprise at least 25 wt. % base polymer, based on the total weight of components other than water in the topcoat formulation, e.g., at least 30 wt. %, at least 35 wt. %, at least 40 wt. %, or at least 45 wt. %. In terms of upper limits, the topcoat formulation may comprise no more than 80 wt. % base polymer, based on the total weight of components other than water in the topcoat formulation, e.g., no more than 75 wt. %, no more than 70 wt. %, no more than 65 wt. %, no more than 60 wt. %, or no more than 55 wt. %. In terms of ranges, the topcoat formulation may comprise from 25 to 80 wt. % base polymer, based on the total weight of the components other than water of the topcoat formulation, e.g., from 30 to 75 wt. %, from 40 to 70 wt. %, from 35 to 65 wt. %, from 40 to 60 wt. % or from 45 to 55 wt. %.

Suitable polyvinylpyrrolidone copolymers for use in the present disclosure may include, but are not limited to polyvinypyrrolidone/vinyl acetate copolymers (PVP/VA). An exemplary PVP/VA copolymer is LUVITEC® 64 P. Additional exemplary copolymers include PVP K 90, PVP K 30, PVP/VA 637, and PVP/VA 730.

In terms of lower limits, the topcoat formulation may comprise at least 1 wt. % polyvinylpyrrolidone copolymer, based on the total weight of components other than water in the topcoat formulation, e.g., at least 3 wt. %, at least 5 wt. %, at least 7.5 wt. %, or at least 10 wt. %. In terms of upper limits, the topcoat formulation may comprise no more than 30 wt. % polyvinylpyrrolidone copolymer, based on the total weight of components other than water in the topcoat formulation, e.g., no more than 27.5 wt. %, no more than 25 wt. %, no more than 22.5 wt. %, or no more than 20 wt. %. In terms of ranges, the topcoat formulation may comprise from 1 to 30 wt. % polyvinylpyrrolidone copolymer, based on the total weight of the components other than water of the topcoat formulation, e.g., from 3 to 27.5 wt. %, from 5 to 25 wt. %, from 7.5 to 22.5 wt. %, or from 10 to 20 wt. %.

As indicated herein, the base polymer also comprises a cationic acrylic resin. Without being bound by theory, it is believed that by including a cationic resin, the topcoat has improved receptivity to anionic films and has improved adhesion and durability, as compared to topcoats without a cationic resin. The cationic acrylic resin allows for anionic inks to be attracted to the cationic acrylic resin, resulting in improved ink fixation and image formation. In some aspects, the cationic acrylic resin is a high molecular weight stabilized cationic acrylic resin, e.g., a cationic acrylic resin marketed as a high molecular weight cationic acrylic resin. The cationic acrylic resin may have hydroxyl functionality. Exemplary cationic acrylic resins include those sold by Gellner Industries LLC, such as OTTOPOL® KX 63 and KX 90. In further embodiments, the cationic acrylic resin need not have hydroxyl functionally and therefore, a crosslinking system is not included. An exemplary cationic acrylic resin that does not have hydroxyl functionality is WORLÉE Print 809, sold by Worlee GmbH.

In terms of lower limits, the topcoat formulation may comprise at least 30 wt. % cationic acrylic resin, based on the total weight of components other than water in the topcoat formulation, e.g., at least 32.5 wt. %, at least 35 wt. %, at least 37.5 wt. %, or at least 40 wt. %. In terms of upper limits, the topcoat formulation may comprise no more than 70 wt. % cationic acrylic resin, based on the total weight of components other than water in the topcoat formulation, e.g., no more than 67.5 wt. %, no more than 65 wt. %, no more than 62.5 wt. %, or no more than 60 wt. %. In terms of ranges, the topcoat formulation may comprise from 30 to 70 wt. % cationic acrylic resin, based on the total weight of the components other than water of the topcoat formulation, e.g., from 32.5 to 67.5 wt. %, from 35 to 65 wt. %, or from 40 to 60 wt. %.

As described herein, the topcoat formulation comprises a pigment system. The components of the pigment system may be selected depending on the desired appearance of the topcoat. The pigment system also contributes to the ink receptivity and pigment fixation of the topcoat. In terms of lower limits, the topcoat formulation may comprise at least 0.01 wt. % pigment system, based on the total weight of dry components in the topcoat formulation, e.g., at least 0.05 wt. %, at least 0.1 wt. %, at least 0.5 wt. %, or at least 1 wt. %. In terms of upper limits, the topcoat formulation may comprise no more than 40 wt. % pigment system, based on the total weight of components other than water in the topcoat formulation, e.g., no more than 37.5 wt. %, no more than 35 wt. %, no more than 32.5 wt. %, or no more than 30 wt. %. In terms of ranges, the topcoat formulation may comprise from 0.01 to 40 wt. % pigment system, based on the total weight of the components other than water of the topcoat formulation, e.g., from 32.5 to 67.5 wt. %, from 35 to 65 wt. %, or from 40 to 60 wt. %.

The pigment system described herein may comprise a pigment, a filler, and a binding agent. One exemplary pigment system comprises kaolin clay, fumed silica, and precipitated silica. The pigment may be any known pigment that imparts the desired color into the final topcoat. In some aspects, the topcoat is desirably opaque. In such aspects, titanium dioxide or a kaolin clay, such as Ansilex 93, may be used as a pigment. Kaolin clay may, in some aspects, be used as the pigment due to its ability to absorb ink and improve pigment fixation. Additionally, kaolin clay may have a relatively fine particle size and may be more easily dispersible than titanium dioxide.

In terms of lower limits, the topcoat formulation may comprise at least 0.01 wt. % pigment, based on the total weight of the pigment system, e.g., at least 0.05 wt. %, at least 0.1 wt. %, at least 0.5 wt. %, or at least 1 wt. %. In terms of upper limits, the topcoat formulation may comprise no more than 40 wt. % pigment, based on the total weight of the pigment system, e.g., no more than 37.5 wt. %, no more than 35 wt. %, no more than 32.5 wt. %, or no more than 30 wt. %. In terms of ranges, the topcoat formulation may comprise from 0.01 to 40 wt. % pigment, based on the total weight of the pigment system, e.g., from 0.05 to 37.5 wt. %, from 0.1 to 35 wt. %, from 0.5 to 32.5 wt. %, or from 1 to 30 wt. %.

As described herein, the pigment system may further comprise a filler. Typically the filler are those that have a surface area of at least 1 $m^2/g$. In another embodiment, the surface area of the filler is greater than 5, or greater than 10, or greater than 20 $m^2/g$. In another embodiment, the fillers are those having a surface area of greater than 200 $m^2/g$. The surface area of the filler is determined by BET (Brunauer, Emmett and Teller method described in J. American Chemical Society Vol. 60, page 309 (1938). This method is based on the adsorption of gaseous nitrogen.

Representative fillers can include talc, calcium carbonate, organo-clay, glass fibers, marble dust, cement dust, feldspar, silica or glass, fumed silica, silicates, alumina, various phosphorus compounds, ammonium bromide, titanium dioxide, antimony trioxide, antimony trioxide, zinc oxide, zinc borate, barium sulfate, silicones, aluminum silicate, calcium silicate, glass microspheres, chalk, mica, clays, wollastonite, ammonium octamolybdate, intumescent compounds and mixtures of two or more of these materials. The fillers may also carry or contain various surface coatings or treatments, such as silanes, fatty acids, and the like. Still other fillers can include flame retardants, such as the halogenated organic compounds. In some aspects, the filler includes inorganic materials and include silica, such as amorphous silica, fumed silica, colloidal silica, precipitated silica and silica gels. Additional fillers include a silica, a clay, an alkaline earth metal sulfate or carbonate, an alkaline earth or transition metal oxide or hydroxide. In one embodiment, the filler is a silica having a surface area of at least about 40, or at least 60, or at least about 100 $m^2/g$. In another embodiment, the filler is a silica with a surface area of at least 150, or at least about 200, or at least about 250 $m^2/g$. In some aspects, the filler is a fumed or precipitated silica.

In terms of lower limits, the topcoat formulation may comprise at least 0.01 wt. % filler, based on the total weight of the pigment system, e.g., at least 0.05 wt. %, at least 0.1 wt. %, at least 0.5 wt. %, or at least 1 wt. %. In terms of upper limits, the topcoat formulation may comprise no more than 40 wt. % filler, based on the total weight of the pigment system, e.g., no more than 37.5 wt. %, no more than 35 wt. %, no more than 32.5 wt. %, or no more than 30 wt. %. In terms of ranges, the topcoat formulation may comprise from 0.01 to 40 filler, based on the total weight of the pigment system, e.g., from 0.05 to 37.5 wt. %, from 0.1 to 35 wt. %, from 0.5 to 32.5 wt. %, or from 1 to 30 wt. %.

The pigment system may further comprise a binding agent. In some aspects, the binding agent and filler may be the same component that fulfills both functions. In other aspects, the binding agent is a different component from the filler, even if there is some overlap in function. The binding agent may be a metal oxide, such as aluminum oxide. The aluminum oxide may be fumed, such as that sold as AEROXIDE® C.

In terms of lower limits, the topcoat formulation may comprise at least 0.01 wt. % binding agent, based on the total weight of the pigment system, e.g., at least 0.05 wt. %, at least 0.1 wt. %, at least 0.5 wt. %, or at least 1 wt. %. In terms of upper limits, the topcoat formulation may comprise no more than 40 wt. % binding agent, based on the total weight of the pigment system, e.g., no more than 37.5 wt. %, no more than 35 wt. %, no more than 32.5 wt. %, or no more than 30 wt. %. In terms of ranges, the topcoat formulation may comprise from 0.01 to 40 wt. % binding agent, based on the total weight of the pigment system, e.g., from 0.05 to 37.5 wt. %, from 0.1 to 35 wt. %, from 0.5 to 32.5 wt. %, or from 1 to 30 wt. %.

The topcoat formulation may also comprise a crosslinking system. The crosslinking system comprises a crosslinker that imparts mechanical strength as well as chemical and weather resistance to the topcoat. The crosslinking system may comprise an epoxy crosslinker, such as a multifunctional epoxy resin made from the etherification of glycidyl.

Exemplary crosslinkers include Denacoll 61413 and Erisys GE60. In some aspects, the crosslinker is a sorbitol polyglycidyl ether.

In terms of lower limits, the topcoat formulation may comprise at least 0.01 wt. % crosslinker, based on the total weight of the components other than water, e.g., at least 0.05 wt. %, at least 0.1 wt. %, at least 0.5 wt. %, or at least 1 wt. %. In terms of upper limits, the topcoat formulation may comprise no more than 10 wt. % crosslinker, based on the total weight of the components other than water, e.g., no more than 7.5 wt. %, no more than 5 wt. %, no more than 3.5 wt. %, or no more than 3 wt. %. In terms of ranges, the topcoat formulation may comprise from 0.01 to 10 wt. % crosslinker, based on the total weight of the pigment system, e.g., from 0.05 to 7.5 wt. %, from 0.1 to 5 wt. %, from 0.5 to 3.5 wt. %, or from 1 to 3 wt. %.

The ratio of pigment to binder may range from 1:2 to 3:1, e.g., from 1:1.5 to 3:1, from 1:1 to 2:1 or from 1:1 to 1.5:1.

In some aspects, the topcoat formulation may further comprise a wax. The wax may help to improve scratch resistance. In one embodiment, the particles in the wax are less than 5 microns in size, e.g., less than 0.5 microns. The melting point of the wax or of the mixture of waxes preferably ranges from 50 to 150° C. In addition, the particles in the microdispersion can contain a small amount of oily or pasty fatty additives, one or more surfactants and one or more common liposoluble active ingredients. The waxes include cationic waxes based on PE/HDPE. The melting point of the wax may be at least 100° C., e.g., at least 110° C., at least 120° C., or at least 130° C. Using waxes with such a melting point may provide improved antiblocking properties as compared to a wax with a lower melting point. Additionally, using waxes with such a melting point may lead to improved scuff and scratch resistance as compared to a wax with a lower melting point.

In terms of lower limits, the topcoat formulation may comprise at least 0.01 wt. % wax, based on the total weight of components other than water in the topcoat formulation, e.g., at least 0.05 wt. %, at least 0.1 wt. %, at least 0.5 wt. %, or at least 1 wt. %. In terms of upper limits, the topcoat formulation may comprise no more than 30 wt. % wax, based on the total weight of components other than water in the topcoat formulation, e.g., no more than 27.5 wt. %, no more than 25 wt. %, no more than 22.5 wt. %, or no more than 20 wt. %. In terms of ranges, the topcoat formulation may comprise from 0.01 to 40 wt. % wax, based on the total weight of the components other than water of the topcoat formulation, e.g., from 0.05 to 27.5 wt. %, from 0.1 to 25 wt. %, from 0.5 to 22.5 wt. %, or from 1 to 20 wt. %.

Forming the Coated Substrate

The topcoat formulation, once prepared, may then be coated onto a substrate. The substrate may be coated on one side, two sides, or more sides if possible. As described herein, the substrate is preferably a non-PVC containing substrate. Exemplary non-PVC containing substrates include polypropylene and polyethylene substrates. The substrate is not particularly limited in material or thickness, so long as it does not contain PVC. In some aspects, the substrate may be PE, HDPE, PP, BOPP, PET, or other known substrates.

The topcoat formulation may be coated onto the substrate through various coating methods, including gravure coating, mayer bar coating, and/or knife coating. In some aspects, the substrate, such as a film, is corona treated prior to the topcoat formulation being coated onto the film. Such corona treatment may increase the surface energy of the film, leading to improved adhesion of the topcoat onto the film. The topcoat formulation may be coated onto the substrate at a coatweight from 1 to 20 gsm, e.g., from 5 to 15 gsm or from 5 to 10 gsm. The topcoat weight may be determined to maximize printability on the topcoat as well as acceptable drying of the ink based on the solvents present in the ink.

The final topcoat composition is essentially the same as the dry components described above, since the dry components exclude any water added to the topcoat formulation.

As also noted above, the topcoat layer may be receptive to printing of indicia there-through (e.g., pass-through printing) or thereon (e.g., printed indicia resides on the surface of the topcoat layer or within the topcoat layer). Moreover, certain embodiments may comprise printed indicia. The printed indicia may convey or provide a variety of information in the form of words, numbers, patterns, designs, barcodes or other forms of human or machine readable graphics. The printed indicia may be applied to the first or outermost surface of the first or outermost layer of the label, such as the surface open to the environment. The first or outermost layer of labels according to certain embodiments of the present disclosure may comprise the topcoat layer. In this regard, the printed indicia may be applied by any one of a number of different conventional processes, such as flexographic, letterpress, screen, gravure, photographic printing, or other suitable processes. For print-on-demand applications, a thermal transfer process may apply the print, although other methods can be used, such as dot matrix printing or ink jet printing. For pre-print applications, ultraviolet, aqueous or solvent inks may be used if desired. Any suitable chemical composition of the ink or other substance employed to print the information may be used. In some embodiments, the ink or substance should be selected to produce a printed pattern that is compatible the topcoat layer, such as one that adheres sufficiently to the topcoat layer to allow for a reasonable degree of permanency. In some aspects, the printed indicia is applied by eco solvent, solvent, or inkjet printing.

The following embodiments are contemplated. All combinations of features and embodiments are contemplated.

Embodiment 1: A coated substrate comprising a substrate having a topcoat on at least one surface of the substrate, wherein the topcoat comprises a base polymer comprising a polyvinylpyrrolidone copolymer and a cationic acrylic resin, and a pigment system.

Embodiment 2: An embodiment of embodiment 1, wherein the topcoat and substrate are substantially free of polyvinyl chloride.

Embodiment 3: An embodiment of any of embodiments 1-2, wherein the topcoat comprises printed or image indicia.

Embodiment 4: An embodiment of any one of the embodiments of embodiments 1-3, wherein the topcoat comprises from 25 to 80 wt. % base polymer, based on the total weight of the topcoat.

Embodiment 5: An embodiment of any one of the embodiments of embodiments 1-4, wherein the topcoat comprises from 1 to 20 wt. % polyvinylpyrrolidone copolymer, based on the total weight of the topcoat.

Embodiment 6: An embodiment of any one of the embodiments of embodiments 1-5, wherein the polyvinylpyrrolidone copolymer comprises polyvinylpyrrolidone and vinyl acetate.

Embodiment 7: An embodiment of any one of the embodiments of embodiments 1-6, wherein the base polymer comprises from 20 to 60 wt. % cationic acrylic resin, based on the total weight of the topcoat.

Embodiment 8: An embodiment of any one of the embodiments of embodiments 1-7, wherein the cationic acrylic resin is a high molecular weight cationic stabilized polymer with hydroxyl functionality Embodiment 9: An embodiment of any one of the embodiments of embodiments 1-8, wherein the pigment system comprises a pigment, a filler, and a binding agent.

Embodiment 10: An embodiment of embodiment 9, wherein the filler is a silica

Embodiment 11: An embodiment of any one of the embodiments of embodiments 9-10, wherein the binding agent is a metal oxide.

Embodiment 12: An embodiment of any one of the embodiments of embodiments 1-11, wherein the pigment system comprises from 0.01 to 30 wt. % pigment, based on the total weight of the pigment system.

Embodiment 13: An embodiment of any one of the embodiments of embodiments 1-12, wherein the pigment system comprises from 0.01 to 30 wt. % filler, based on the total weight of the pigment system.

Embodiment 14: An embodiment of any one of the embodiments of embodiments 1-13, wherein the pigment system comprises from 0.01 to 30 wt. % metal oxide, based on the total weight of the pigment system.

Embodiment 15: An embodiment of any one of the embodiments of embodiments 1-14, wherein the formulation comprises from 0.01 to 30 wt. % pigment system, based on the total weight of the topcoat.

Embodiment 16: An embodiment of any one of the embodiments of embodiments 1-15, wherein the formulation further comprises a crosslinking system.

Embodiment 17: A method of forming a coated substrate, the method comprising: providing a substrate; providing a topcoat formulation comprising a base polymer comprising a polyvinylpyrrolidone copolymer and a cationic resin, a pigment system, and water; applying the topcoat formulation onto at least one surface of the substrate; and drying the topcoat formulation on the substrate to form a coated substrate; wherein the topcoat formulation is coated onto the substrate from 1 to 20 gsm.

Embodiment 18: An embodiment of embodiment 17, wherein the topcoat formulation is gravure coated, knife coated, or mayer bar coated onto the substrate.

Embodiment 19: An embodiment of any one of the embodiments of embodiments 17-18, wherein the topcoat formulation is corona treated prior to applying the topcoat formulation to the substrate.

Embodiment 20: An embodiment of any one of the embodiments of embodiments 17-19, wherein the topcoat and substrate are substantially free of polyvinyl chloride.

Embodiment 21: An embodiment of any one of the embodiments of embodiments 17-20, further comprising printing text or an image on the topcoat.

Embodiment 22: An embodiment of any one of the embodiments of embodiments 17-21, wherein the formulation comprises from 25 to 80 wt. % base polymer, based on the total weight of the topcoat formulation, excluding water.

Embodiment 23: An embodiment of any one of the embodiments of embodiments 17-22, wherein the formulation comprises from 1 to 20 wt. % polyvinylpyrrolidone copolymer, based on the total weight of the topcoat formulation, excluding water.

Embodiment 24: An embodiment of any one of the embodiments of embodiments 17-23, wherein the polyvinylpyrrolidone copolymer comprises polyvinylpyrrolidone and vinyl acetate.

Embodiment 25: An embodiment of any one of the embodiments of embodiments 17-24, wherein the base polymer comprises from 20 to 60 wt. % cationic acrylic resin, based on the total weight of the topcoat formulation, excluding water.

Embodiment 26: An embodiment of any one of the embodiments of embodiments 17-25, wherein the cationic acrylic resin is a high molecular weight cationic stabilized polymer with hydroxyl functionality.

Embodiment 27: An embodiment of any one of the embodiments of embodiments 17-26, wherein the pigment system comprises a pigment, a filler, and a binding agent.

Embodiment 28: An embodiment of embodiment 27, wherein the filler is a silica.

Embodiment 29: An embodiment of any one of the embodiments of embodiments 28-29, wherein the binding agent is a metal oxide.

Embodiment 30: An embodiment of any one of the embodiments of embodiments 17-29, wherein the pigment system comprises from 0.01 to 30 wt. % pigment, based on the total weight of the pigment system.

Embodiment 31: An embodiment of any one of the embodiments of embodiments 17-30, wherein the pigment system comprises from 0.01 to 30 wt. % filler, based on the total weight of the pigment system.

Embodiment 32: An embodiment of any one of the embodiments of embodiments 17-31, wherein the pigment system comprises from 0.01 to 30 wt. % metal oxide, based on the total weight of the pigment system.

Embodiment 33: An embodiment of any one of the embodiments of embodiments 17-32, wherein the formulation comprises from 0.01 to 30 wt. % pigment system, based on the total weight of the topcoat formulation, excluding water.

Embodiment 34: An embodiment of any one of the embodiments of embodiments 17-33, wherein the formulation further comprises crosslinking system.

Embodiment 35: A topcoat comprising a base polymer and a pigment system, wherein the base polymer comprises a polyvinylpyrrolidone copolymer and a cationic acrylic resin.

Embodiment 36: An embodiment according to embodiment 35, wherein the topcoat further comprises a pigment system.

Embodiment 37: of any of embodiments 35-36, wherein the topcoat is substantially free of polyvinyl chloride.

Embodiment 38: An embodiment of any one of the embodiments of embodiments 35-37, wherein the topcoat comprises from 25 to 80 wt. % base polymer, based on the total weight of the topcoat.

Embodiment 39: An embodiment of any one of the embodiments of embodiments 35-38, wherein the topcoat comprises from 1 to 20 wt. % polyvinylpyrrolidone copolymer, based on the total weight of the topcoat.

Embodiment 40: An embodiment of any one of the embodiments of embodiments 35-39, wherein the polyvinylpyrrolidone copolymer comprises polyvinylpyrrolidone and vinyl acetate.

Embodiment 41: An embodiment of any one of the embodiments of embodiments 35-40, wherein the base polymer comprises from 20 to 60 wt. % cationic acrylic resin, based on the total weight of the topcoat.

Embodiment 42: An embodiment of any one of the embodiments of embodiments 35-41, wherein the cationic acrylic resin is a high molecular weight cationic stabilized polymer with hydroxyl functionality Embodiment 43: An embodiment of any one of the embodiments of embodiments 36-42, wherein the pigment system comprises a pigment, a filler, and a binding agent.

Embodiment 44: An embodiment of embodiment 43, wherein the filler is a silica

Embodiment 45: An embodiment of any one of the embodiments of embodiments 43-44, wherein the binding agent is a metal oxide.

Embodiment 46: An embodiment of any one of the embodiments of embodiments 36-45, wherein the pigment system comprises from 0.01 to 30 wt. % pigment, based on the total weight of the pigment system.

Embodiment 47: An embodiment of any one of the embodiments of embodiments 36-46, wherein the pigment system comprises from 0.01 to 30 wt. % filler, based on the total weight of the pigment system.

Embodiment 48: An embodiment of any one of the embodiments of embodiments 36-47, wherein the pigment system comprises from 0.01 to 30 wt. % metal oxide, based on the total weight of the pigment system.

Embodiment 49: An embodiment of any one of the embodiments of embodiments 36-48, wherein the formulation comprises from 0.01 to 30 wt. % pigment system, based on the total weight of the topcoat.

Embodiment 50: An embodiment of any one of the embodiments of embodiments 35-49, wherein the formulation further comprises a crosslinking system.

Embodiment 51: An embodiment of any one of the embodiments 1-50, wherein the cationic acrylic resin does not have hydroxyl functionality and wherein a crosslinking system is not included.

EXAMPLES

The present disclosure will be better understood in view of the following non-limiting examples.

Example 1

A topcoat formulation was prepared having the components as shown in Table 1.

TABLE 1

| Topcoat Formulation 1 | |
| --- | --- |
| Component | Weight (g) |
| PVP/VA Copolymer | 5.77 |
| Cationic Acrylic Resin | 46.14 |
| Pigment | 2.5 |
| Binding Agent | 2.5 |
| Filler | 12 |
| Wax | 2.5 |
| Crosslinker | 0.30 |
| Water | 27.59 |

The topcoat formulation was coated onto identical polyethylene films and dried. Then, colors CMYK were printed onto separate the topcoat of separate films at three different speeds: 100 m/min, 120 m/min and 150 m/min.

A segment of 3M Scotch Magic™ Tape was applied to each topcoat and removed. The topcoats retained the ink and passed the test for each print speed.

The same topcoat formulations were then coated onto three identical polyethylene films. The coated substrates were then aged at 60° C., 40° C. and −20° C., respectively, for one week each. Even after aging, the topcoat on each coated substrate passed the 3M Scotch Magic™ Tape test, indicating good ink anchorage of film after aging.

Example 2

A topcoat formulation was prepared having the following components:

TABLE 2

| Topcoat Formulation 2 | |
| --- | --- |
| Component | Weight (g) |
| PVP/VA Copolymer | 5.77 |
| Cationic Acrylic Resin | 46.14 |
| Defoamer | 0.5 |
| Wetting Agent | 0.5 |
| Kaolin Clay | 2.5 |
| Fumed Silica | 2.5 |
| Precipitated Silica | 12 |
| HDPE Wax | 2.5 |
| Water | 27.5 |

Comparative Examples A and Samples 1-8

The following comparative example and examples (samples 1-8) were prepared.

TABLE 3

| | Examples | | | | | | | | |
| --- | --- | --- | --- | --- | --- | --- | --- | --- | --- |
| Component | Comp. A (g) | Sample 1 (g) | Sample 2 (g) | Sample 3 (g) | Sample 4 (g) | Sample 5 (g) | Sample 6 (g) | Sample 7 (g) | Sample 8 (g) |
| PVP/VA | 0.00 | 5.77 | 5.77 | 5.77 | 5.77 | 5.77 | 5.77 | 5.77 | 5.77 |
| Water | 27.59 | 27.59 | 27.59 | 27.59 | 27.59 | 27.59 | 27.59 | 27.59 | 27.59 |
| Cationic polymer | 46.14 | 46.14 | 46.14 | 46.14 | 46.14 | 46.14 | 46.14 | 46.14 | 46.14 |
| Wetting agent | 0.50 | 0.50 | 0.50 | 0.5 | 0.50 | 0.50 | 0.50 | 0.50 | 0.50 |
| Defoamer | 0.50 | 0.50 | 0.50 | 0.50 | 0.50 | 0.50 | 0.50 | 0.50 | 0.50 |
| Kaolin Clay | 2.50 | 2.50 | 2.50 | 2.50 | 0.00 | 2.50 | 0.00 | 2.50 | 2.50 |
| Fumed Silica | 2.50 | 2.50 | 2.50 | 2.50 | 2.50 | 0.00 | 0.00 | 2.50 | 12.00 |
| Precipitated Silica | 12 | 0 | 12 | 12 | 12 | 12 | 12 | 6 | 0 |
| HDPE wax | 2.50 | 2.50 | 2.50 | 0.00 | 2.50 | 2.50 | 2.50 | 2.50 | 2.50 |
| Water | 5.77 | 12.00 | 46.14 | 2.50 | 2.50 | 2.50 | 5.00 | 6.00 | 0.00 |
| Total | 100.0 | 100.0 | 146.1 | 100.0 | 100.0 | 100.00 | 100.0 | 100.0 | 97.50 |

Example 3

Each formulation for Example 2 and Sample Examples 1-8 was coated onto a film by mayer bar coating and dried in an oven at 110° C. for 5 minutes. The dried coat weight for each formulation was 12 gsm. The coated samples were then kept for room curing for 24 hours. An eco solvent printer was then used to print on each formulation. Various characteristics of the printed topcoat were then evaluated. The results are shown below.

TABLE 4

Printed Topcoat Characteristics

| Test | Comp. Ex. 2 | Comp. A | Sample 1 | Sample 2 | Sample 3 | Sample 4 | Sample 5 | Sample 6 | Sample 7 | Sample 8 |
|---|---|---|---|---|---|---|---|---|---|---|
| Drying of the ink | best | slow | poor | best | good | good | good | good | good | good |
| Image quality | best | good | good | good | good | good | good | good | good | good |
| Rub resistance | best | good | good | poor | good | good | good | good | good | good |
| Water resistance | best | good | good | poor | good | good | good | good | good | good |
| Durability | best | good | good | poor | good | good | good | good | good | good |
| Ink receptivity | best | good | Poor | good | good | good | good | good | good | good |
| Anti-blocking | good | good | good | good | poor | good | good | good | good | good |

Example 4

The topcoat formulation of Example 2 was coated as described in Example 3. Various print weights were then applied using two different printers. The print performance was then evaluated as shown below. The performance was evaluated on a scale of 1 to 3, with 1 indicating poor performance, 2 indicating mediocre performance, and 3 indicating good performance. MDS is shorthand for Machine Directional Streaks.

TABLE 5

XC 540 Roland MPI1105 Profile Print performance evaluation

|  | 20 Gram | 15 Gram HG | 15 Gram LG | 12 Gram |
|---|---|---|---|---|
| Grain | 2 | 2 | 2 | 2 |
| Mottle/Mid Tone | 2 | 3 | 2 | 3 |
| Mottle/High Ink Load | 3 | 3 | 3 | 3 |
| White Spots | 3 | 3 | 3 | 3 |
| Banding | 3 | 3 | 3 | 3 |
| Logo Ghosting | 3 | 3 | 3 | 3 |
| Dewets | 3 | 3 | 3 | 3 |
| Random Defects | MDS | MDS | MDS | MDS |

TABLE 6

XC 540 Roland PET Profile Print performance evaluation

|  | 20 Gram | 15 Gram HG | 15 Gram LG | 12 Gram |
|---|---|---|---|---|
| Grain | 2 | 2 | 1 | 2 |
| Mottle/Mid Tone | 3 | 3 | 2 | 3 |
| Mottle/High Ink Load | 3 | 2 | 1 | 1 |
| White Spots | 3 | 2 | 2 | 2 |
| Banding | 2 | 1 | 3 | 3 |
| Logo Ghosting | 3 | 3 | 3 | 3 |
| Dewets | 3 | 3 | 3 | 3 |
| Random Defects | MDS | MDS | MDS | MDS |

Example 5

A topcoat formulation was prepared having the following components:

TABLE 7

Topcoat Formulation 3

| Component | Weight (g) |
|---|---|
| PVP/VA Copolymer | 3-6 |
| Cationic Acrylic Resin without hydroxyl functionality | 25-35 |
| Wax (optional) | 0.25-3 |
| Dispersing agent (optional) | 0.25-3 |
| Silica (optional) | 2-6 |
| Antistatic agent (optional) | 0.5-1.5 |
| Water | Add to give 100 g total |

As shown in Table 7, the only required components are the PVP/VA copolymer, the cationic acrylic polymer, and water. The cationic acrylic polymer did not have hydroxyl functionality and therefore, no crosslinker was included. The topcoat formulation was then coated onto a polyethylene film and aged for one week. Even after aging, the topcoat passed the 3M Scotch Magic™ Tape test, indicating good ink anchorage of film after aging.

Example 6

A topcoat formulation was prepared as in Table 7, except that the PVP/VA copolymer amount was reduced to 1.25 wt. %. The topcoat formulation was then coated on two different substrates: clear BOPP and white PP. For each coating, the 3M Scotch Magic™ Tape test was conducted. Both test results indicated 10% ink peel off, an acceptable result. This relatively lower amount of PVP/VA copolymer in the formulation achieved good ink receptivity and good ink transfer results.

These and other modifications and variations to the present disclosure may be practiced by those of ordinary skill in the art without departing from the spirit and scope of the present disclosure, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the disclosure as further described in such appended claims. Therefore, the spirit and scope of the appended claims should not be limited to the exemplary description of the versions contained herein.

I claim:

1. A topcoat comprising a base polymer and a pigment system, wherein the base polymer comprises a polyvinylpyrrolidone copolymer and a cationic acrylic resin; and wherein the polyvinylpyrrolidone copolymer comprises polyvinylpyrrolidone and vinyl acetate, wherein the topcoat comprises at least 35 wt. % cationic acrylic resin, based on the total weight of components other than water in the topcoat, wherein the topcoat comprises from 0.01 to 40 wt. % pigment system, based on the total weight of the components other than water in the topcoat.

2. The topcoat of claim 1, wherein the topcoat is substantially free of polyvinyl chloride.

3. The topcoat of claim 1, wherein the topcoat comprises from 25 to about 65 wt. % base polymer, based on the total weight of the topcoat.

4. The topcoat of claim 1, wherein the topcoat comprises from 1 to 20 wt. % polyvinylpyrrolidone copolymer, based on the total weight of the topcoat.

5. The topcoat of claim 1, wherein the cationic acrylic resin does not have hydroxyl functionality and further wherein the topcoat does not comprise a crosslinker.

6. The topcoat of claim 1, wherein the cationic acrylic resin is a high molecular weight cationic stabilized polymer with hydroxyl functionality.

7. The topcoat of claim 1, wherein the base polymer comprises from 35 to 60 wt. % cationic acrylic resin, based on the total weight of the topcoat.

8. The topcoat of claim 1, wherein the pigment system comprises a pigment, a filler, and a binding agent.

9. The topcoat of claim 8, wherein the filler is a silica.

10. The topcoat of claim 8, wherein the binding agent is a metal oxide.

11. The topcoat of claim 1, wherein the pigment system comprises from 0.01 to 30 wt. % pigment, based on the total weight of the pigment system.

12. The topcoat of claim 1, wherein the pigment system comprises from 0.01 to 30 wt. % filler, based on the total weight of the pigment system.

13. The topcoat of claim 1, wherein the pigment system comprises from 0.01 to 30 wt. % metal oxide, based on the total weight of the pigment system.

14. The topcoat of claim 1, further comprising: a crosslinking system.

15. A coated substrate comprising a substrate having a topcoat according to claim 1 on at least one surface of the substrate.

16. The coated substrate of claim 15, wherein the topcoat comprises printed or image indicia thereon.

17. A method of forming the coated substrate of claim 15, the method comprising:
providing a substrate; providing the topcoat formulation;
applying the topcoat formulation onto at least one surface of the substrate; and
drying the topcoat formulation on the substrate to form a coated substrate;
wherein the topcoat formulation is coated onto the substrate from 1 to 20 gsm.

18. The method of claim 17, wherein the topcoat formulation is applied to the substrate by gravure coating, knife coating or mayer bar coating onto the substrate.

19. The method according claim 17, wherein the topcoat formulation is corona treated prior to applying the topcoat formulation to the substrate.

20. The method according to claim 17, further comprising printing text or an image on the topcoat.

* * * * *